United States Patent
Liu et al.

(10) Patent No.: US 6,621,045 B1
(45) Date of Patent: Sep. 16, 2003

(54) WORKPIECE STABILIZATION WITH GAS FLOW

(75) Inventors: Xinbing Liu, Acton, MA (US); Ming Li, Chelmsford, MA (US); Chen-Hsiung Cheng, Chelmsford, MA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/266,936

(22) Filed: Oct. 8, 2002

Related U.S. Application Data
(60) Provisional application No. 60/398,376, filed on Jul. 25, 2002.

(51) Int. Cl.[7] .............................................. B23K 26/38
(52) U.S. Cl. ................................................... 219/121.7
(58) Field of Search .......................... 219/121.6, 121.67, 219/121.7, 121.71, 121.72, 121.84

(56) References Cited

U.S. PATENT DOCUMENTS 4,027,137 A * 5/1977 Liedtke
4,461,947 A * 7/1984 Ward
4,906,812 A * 3/1990 Nied et al.
6,365,869 B1 * 4/2002 Swain et al.

* cited by examiner

Primary Examiner—Samuel M. Heinrich
(74) Attorney, Agent, or Firm—Harness, Dickey & Pierce, PLC

(57) ABSTRACT

A method is provided for maintaining a workpiece in a focal plane of a laser drilling system. The method includes: providing a workpiece holder that is adapted to releasably retain a workpiece on a planar surface thereof, the planar surface having a recess extending therein; positioning the workpiece onto a planar surface of a workpiece holder, such that the workpiece extends across the recess formed in the workpiece holder and an exposed surface of the workpiece aligns with a focal plane of a laser drilling system; projecting a laser beam from the laser drilling system onto the exposed surface of the workpiece, thereby forming an ablation on the exposed surface of the workpiece; and directing a flow of gas onto the exposed surface of the workpiece substantially concurrent with the step of projecting a laser beam, such that the flow of gas substantially impinges on an area of the exposed surface that extends across the recess formed in the workpiece holder, thereby maintaining the exposed surface of the workpiece in the focal plane of the laser drilling system during the laser drilling operation.

23 Claims, 5 Drawing Sheets

Cross-sectional view of gas delivery system and workpiece holder

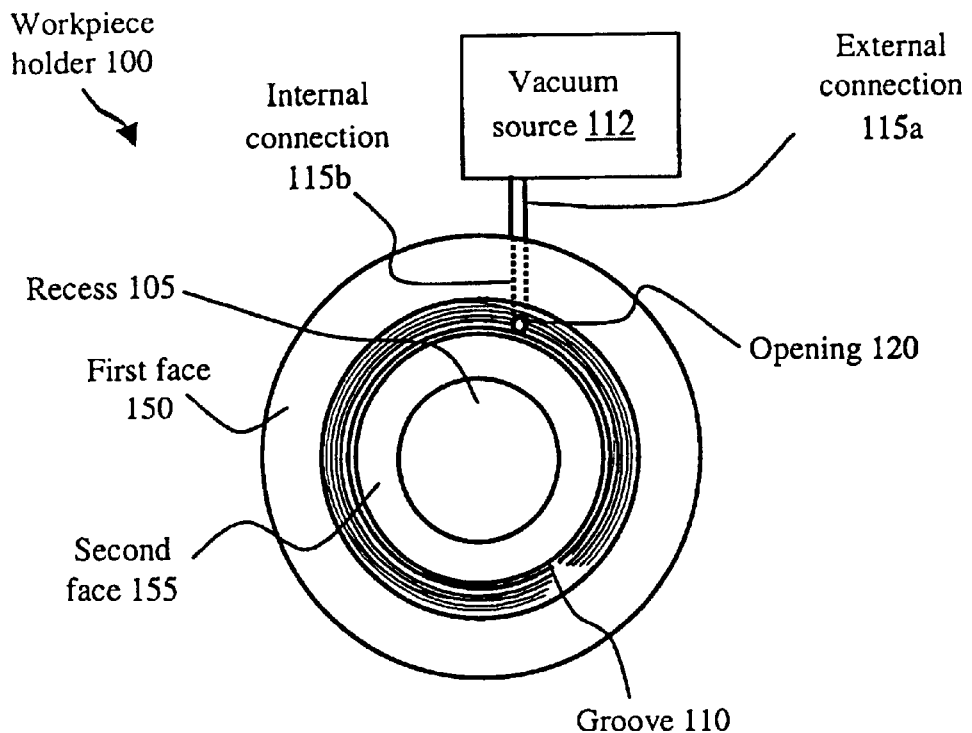
Figure 1A Top view of prior art workpiece holder
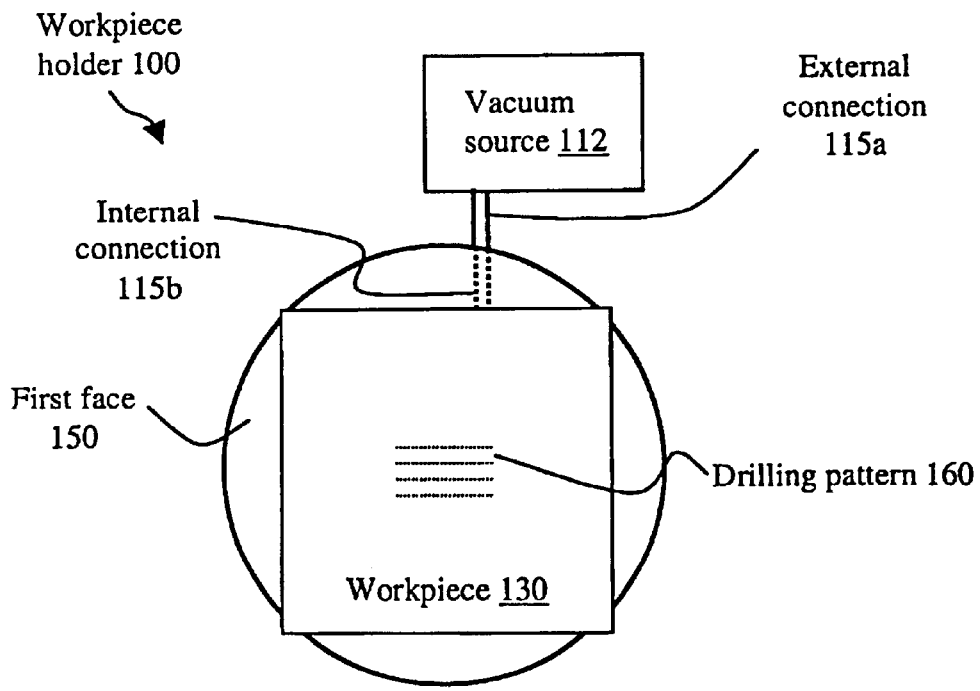
Figure 1B Top view of prior art workpiece holder with workpiece

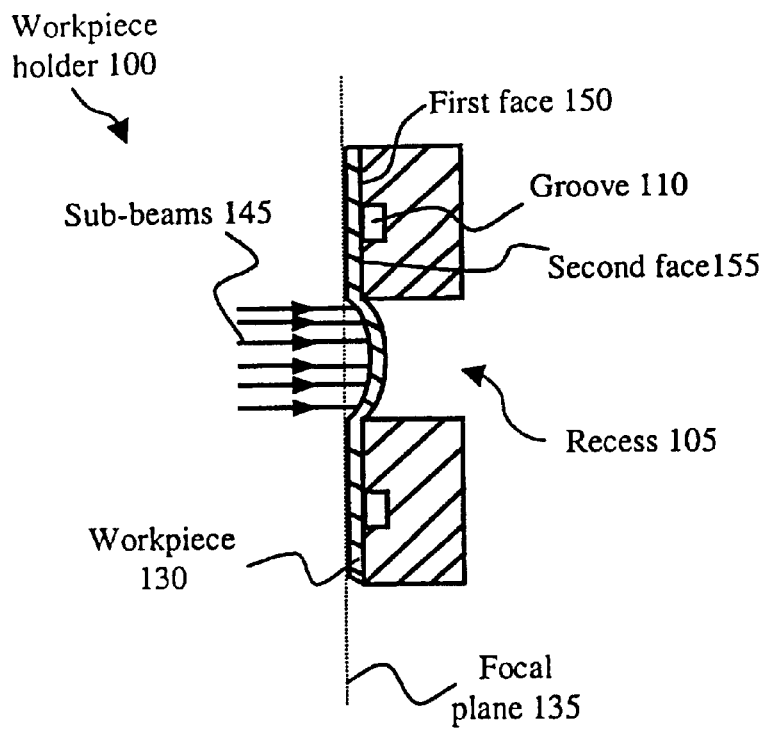
Figure 1C Side view of prior art workpiece holder showing incident sub-beams
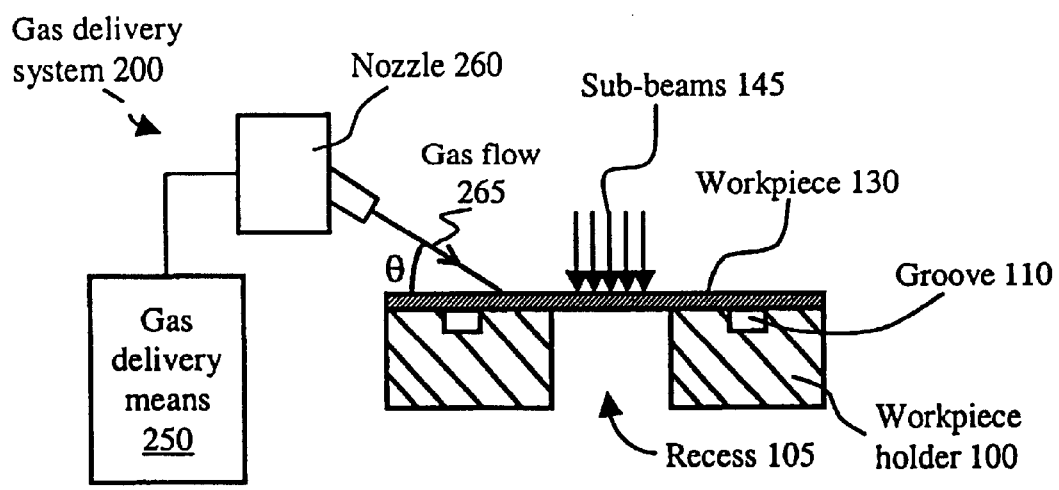
Figure 2 Cross-sectional view of gas delivery system and workpiece holder

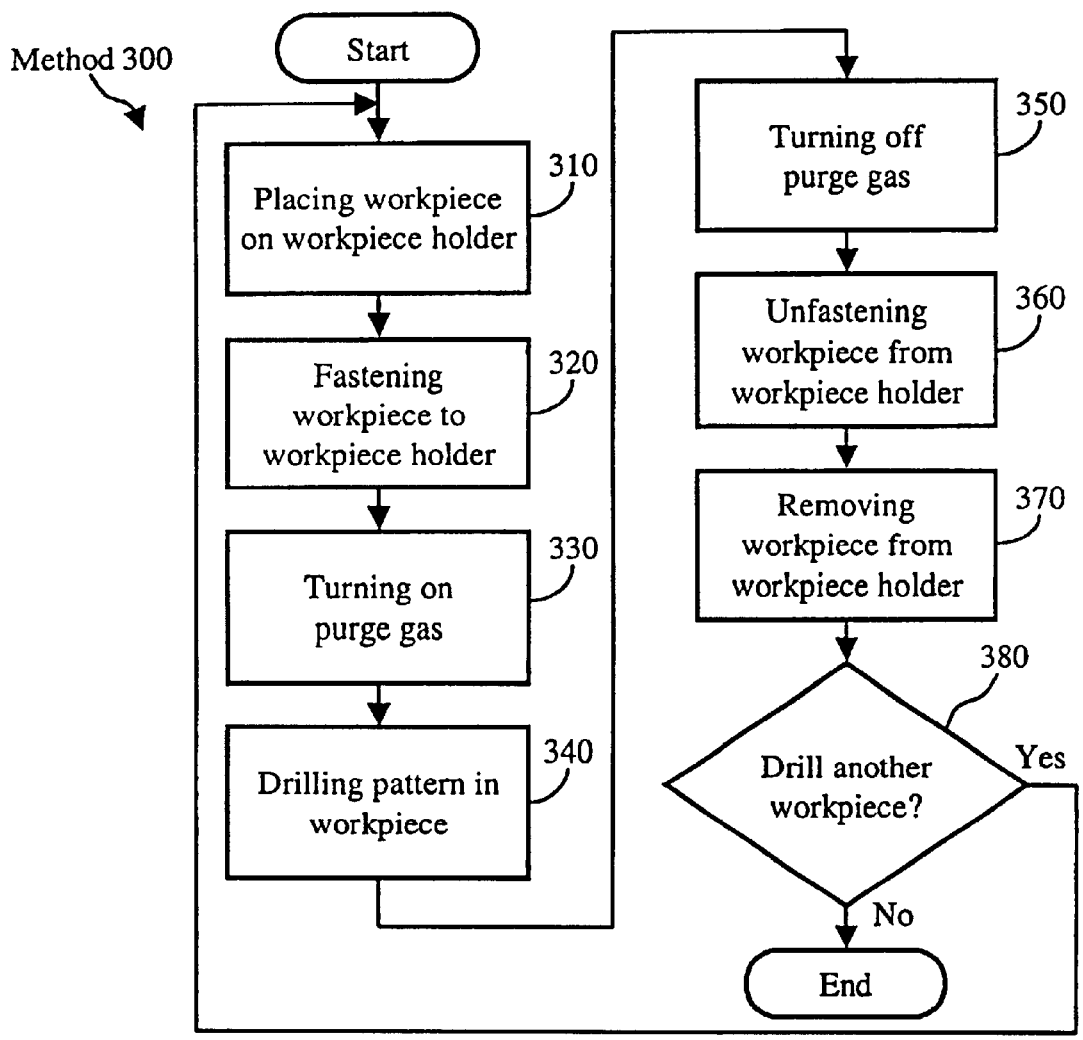
Figure 3 Method of using gas delivery system with laser drilling system

WORKPIECE STABILIZATION WITH GAS FLOW

CROSS-REFERENCE TO RELATED APPLICATIONS

This application claims the benefit of U.S. Provisional Application Serial No. 60/398,376 which was filed on Jul. 25, 2002 and is incorporated by reference herein.

FIELD OF THE INVENTION

The present invention relates generally to laser drilling, and more particularly, to a method for maintaining a workpiece in a focal plane of a laser drilling system.

BACKGROUND OF THE INVENTION

Material ablation by pulsed light sources has been studied since the invention of the laser. Reports in 1982 of polymers having been etched by ultraviolet (UV) excimer laser radiation stimulated widespread investigations of the process for micromachining. Since then, scientific and industrial research in this field has proliferated—mostly spurred by the remarkably small features that can be drilled, milled, and replicated through the use of lasers.

Ultrafast lasers generate intense laser pulses with durations from roughly $10^{-11}$ seconds (10 picoseconds) to $10^{-14}$ seconds (10 femtoseconds). Short pulse lasers generate intense laser pulses with durations from roughly $10^{-10}$ seconds (100 picoseconds) to $10^{-11}$ seconds (10 picoseconds). A wide variety of potential applications for ultrafast and short pulse lasers in medicine, chemistry, and communications are being developed and implemented. These lasers are also a useful tool for milling or drilling holes in a wide range of materials. Hole sizes as small as a few microns, even sub-microns, can readily be drilled. High aspect ratio holes can be drilled in hard materials, such as cooling channels in turbine blades, nozzles in ink-jet printers, or via holes in printed circuit boards.

Optical parallel processing of laser-milled holes is key to increasing the throughput of, and the profitability of laser micromachining. Beamsplitting devices such as diffractive optical elements are currently used in laser micromachining to divide a single beam into multiple beams to allow for parallel processing of the workpiece (i.e., material to be drilled).

Currently, one way to prevent a laser drilling system's sub-beams from damaging the workpiece holder is to use a workpiece holder with a large recess behind the target area, such that the sub-beams pass through the workpiece holder after milling through the workpiece itself. Performing parallel laser drilling upon a flimsy workpiece presents a set of challenges related to keeping the flimsy workpiece surface in the focal plane. A workpiece holder with a single large recess behind the target area does not provide sufficient support to keep the flimsy workpiece in the focal plane when the foil is subject to recoil pressure due to laser ablation.

In order to perform precision laser drilling in a parallel process system, the workpiece surface must remain in the focal plane (where the laser beams are focused) of the laser drilling system throughout the laser drilling to enable the beams to drill workpiece geometries meeting precise specifications. However, the use of thin, flimsy workpieces (workpieces that bend and move outside the focal plane of the drilling laser beam when the workpiece is impacted with the beam(s)), which are required in some applications, such as inkjet nozzles, poses a challenge because the workpiece deforms during drilling and moves outside the focal plane of the laser system. This results in poor quality laser-drilled holes and an inability to meet required product specifications.

When a laser drilling system's sub-beams are incident upon a flimsy workpiece, the kickback of debris causes significant recoil force upon the workpiece, causing the workpiece to deform and move outside the laser drilling system's focal plane. If the sub-beams are out of focus when incident upon the workpiece, the result will be poor quality and misshapen holes that do not meet product specifications or obtain the desired benefits of precision laser micromachining. What is needed is a way to counteract workpiece deformation when using parallel process laser drilling on a flimsy workpiece.

One way to counteract the workpiece deformation is to reduce the atmospheric pressure in front of the workpiece. A reduction in atmospheric pressure exerts a force upon the workpiece that moves it toward the area of reduced atmospheric pressure. A sufficient reduction in atmospheric pressure in front of the workpiece counteracts the deformation of the workpiece caused by the recoil force.

SUMMARY OF THE INVENTION

In accordance with the present invention, a method is provided for maintaining a workpiece in a focal plane of a laser drilling system. The method includes: providing a workpiece holder that is adapted to releasably retain a workpiece on a planar surface thereof, the planar surface having a recess extending therein; positioning the workpiece onto a planar surface of a workpiece holder, such that the workpiece extends across the recess formed in the workpiece holder and an exposed surface of the workpiece aligns with a focal plane of a laser drilling system; projecting a laser beam from the laser drilling system onto the exposed surface of the workpiece, thereby forming an ablation on the exposed surface of the workpiece; and directing a flow of gas onto the exposed surface of the workpiece, substantially concurrent with the step of projecting a laser beam, such that the flow of gas substantially impinges on an area of the exposed surface that extends across the recess formed in the workpiece holder, thereby maintaining the exposed surface of the workpiece in the focal plane of the laser drilling system during the laser drilling operation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIG. 1A is a top view of a conventional workpiece holder;

FIG. 1B is a top view of the conventional workpiece holder supporting a workpiece thereon;

FIG. 1C is a side view of the conventional workpiece holder illustrating the affect of a series of laser sib-beams incident on a surface of the workpiece;

FIG. 2 is a fragmentary side view of an exemplary laser drilling system which employs a gas delivery subsystem in accordance with the present invention;

FIG. 3 is a flowchart illustrating a method of using the gas delivery subsystem in accordance with the present invention.

DETAILED DESCRIPTION OF THE PREFERRED EMBODIMENTS

Figure 4:
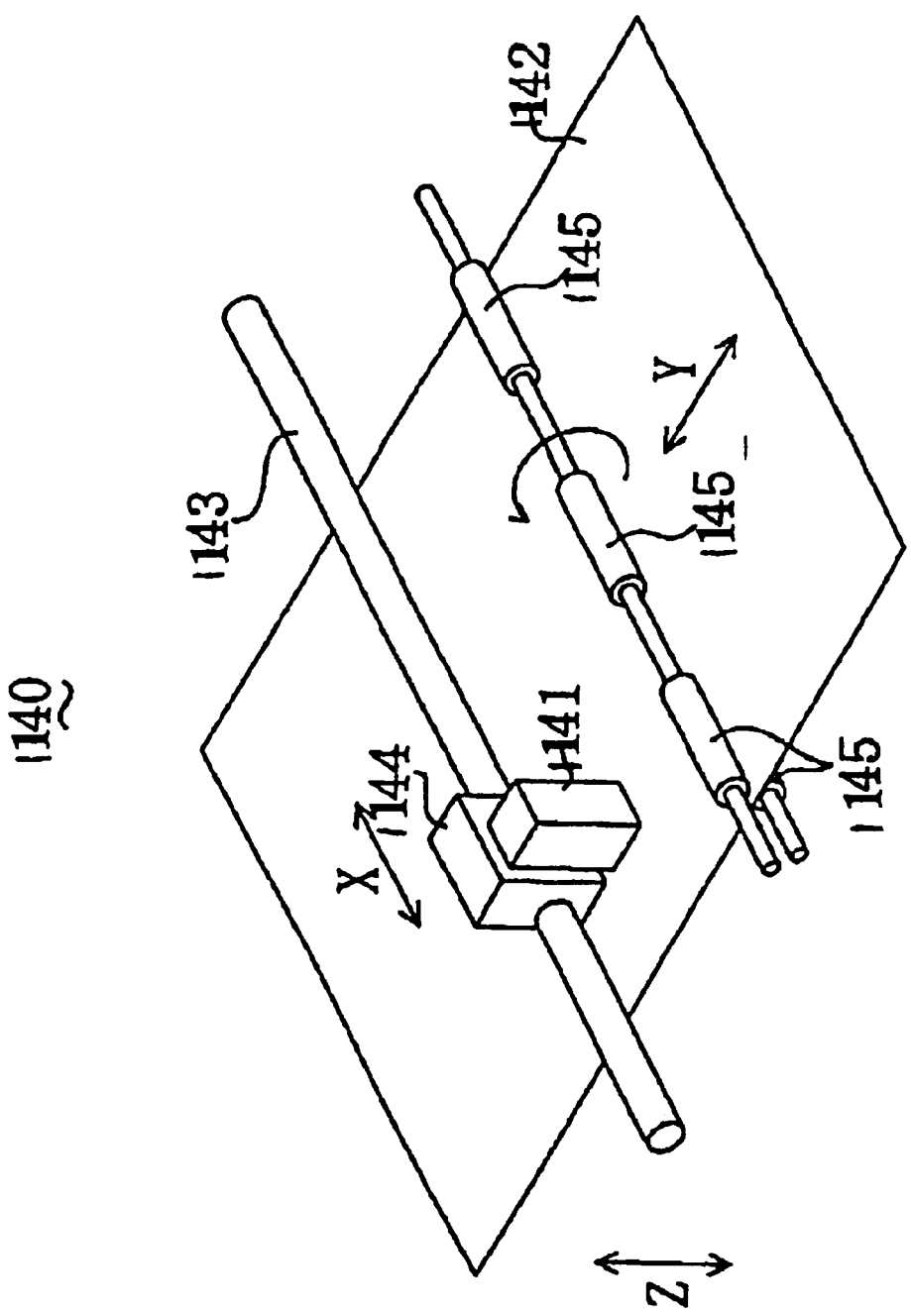
FIG. 4 is a perspective view illustrating the primary components of an ink-jet printer.

FIG. 1A shows a top view of a conventional workpiece holder 100, including a recess 105, a groove 110, a vacuum source 112, an external connection 115a, an internal connection 115b, an opening 120, a first face 150, and a second face 155. The first face 150 is the planar surface defined between the recess 105 and the groove 110; whereas the second face 155 is the planar surface defined between the groove and the outer periphery of the workpiece holder 100.

FIG. 1B is a top view of the conventional workpiece holder 100 supporting a workpiece 130 thereon. The workpiece 130 is fastened to workpiece holder 100, such that the workpiece 130 extends across the recess 105 formed in the workpiece holder 100. In a laser drilling system, the workpiece holder 100 is used to support the workpiece 130 during laser drilling. The drilling pattern 160 is the pattern of holes to be drilled by laser drilling system (not shown). An exemplary drilling pattern 160 is illustrated on the exposed surface of the workpiece 130.

Workpiece holder 100 is round, but could be formed in a variety of shapes, including triangles, squares, rectangles, pentagons, etc. Workpiece holder 100 is made of a hard, durable, stiff, and heat-resistant material (e.g., steel, aluminum, machinable ceramic, etc.). Workpiece holder 100 is generally attached to the stage in a laser drilling system with nuts and bolts or other similar attachment, means. In one embodiment, the workpiece holder 100 is attached to a fixed stage. In another embodiment, the workpiece holder 100 is attached to a moveable stage.

Recess 105 is an opening allowing the laser system sub-beams to propagate through workpiece holder 100 without impacting and damaging workpiece holder 100. It is readily understood that the recess 105 is larger than the drilling pattern 160 formed in the workpiece 130.

Groove 110 is a grooved area around workpiece holder 100. In a preferred embodiment, the groove 110 is rectangular in shape with corners at 90-degree angles; however, groove 110 is not limited to this shape. For instance, the groove 110 may have a circular shape. The groove 110 is dimensioned such that the workpiece 130 covers the recess 105 and the groove 110.

Opening 120 is a hole that provides an opening for vacuum source 112 to remove air from groove 110 under workpiece 130. In an exemplary embodiment, opening 120 is a round hole; however, opening 120 is not limited to this shape. Opening 120 connects with internal connection 115b through workpiece holder 100 and to external connection 115a, thereby allowing air to be drawn through opening 120 by vacuum source 112.

Vacuum source 112 may be implemented as a conventional vacuum pump such as those commercially available from Varian and GAST Mfg Corp. Vacuum source 112 draws air through opening 120, internal connection 115b, and external connection 115a from groove 110 underneath the workpiece, thereby effectively fastening it to workpiece holder 100.

External connection 115a is a connection between vacuum source 112 and workpiece holder 100. In one embodiment, the external connection 115a is a flexible hose connected between the vacuum source 112 and the workpiece holder 100. The internal connection 115b is formed as a through hole between the internal opening 120 into the groove 110 and an opening along the external surface of the workpiece holder 100. External connection 115a and internal connection 115b are used to remove air from groove 110 as described above.

FIG. 1C shows a side view of workpiece holder 100, including recess 105, groove 110, workpiece 130, first face 150, and second face 155. Of particular interest, several sub-beams 145 are shown incident upon the surface of the workpiece 130. The sub-beams may be emitted from a beamsplitter (not shown) and are used to perform parallel process laser drilling of the drilling pattern 160 in the targeted workpiece 130. Sub-beams 145 are focused at a focal plane 135.

However; due to the flimsy nature of the workpiece, the surface of the workpiece 130 is shown not aligned with the focal plane 135 of the laser drilling system. In one exemplary embodiment, the workpiece 130 may be further defined as a stainless steel inkjet nozzle foil. The result of drilling operation deforms the workpiece 130 such that is does not meet product specifications (e.g., hole size, hole shape, taper angle). The deformation of workpiece 130 is the problem solved by the present invention.

In operation, vacuum source 112 is turned on to hold workpiece 130 against workpiece holder 100 by removing air from groove 110, through opening 120, internal connection 115b, and external connection 115a, creating a reduced atmospheric pressure in groove 110 such that the ambient atmospheric pressure fastens workpiece 130 to workpiece holder 100. Sub-beams 145 propagate from a beamsplitter (not shown) in a laser drilling system (not shown), are incident upon workpiece 130, and are maneuvered to drill the desired workpiece geometry in workpiece 130. The recoil pressure caused by debris kickback during ablation by sub-beams 145 causes workpiece 130 to deform and moves the targeted pattern area of workpiece 130 out of focal plane 135.

In accordance with the present invention, the laser drilling system further includes a gas delivery subsystem 200 as shown in FIG. 2. The gas delivery subsystem 200 is comprised of a gas delivery means 250, including a nozzle 260. The gas delivery subsystem 200 is generally operable to direct a flow of gas onto the exposed surface of the workpiece 130.

Gas delivery means 250 may be implement as an air pump (e.g., an air compressor) that delivers gas flow 265 from a nozzle 260 therein. The gas delivery means 250 may contain a regulator that controls the flow and force of the gas, as well as an air filtration system to ensure that the gas is clean (e.g., free of dust, oil and excessive moisture) when incident upon workpiece 130. The nozzle 260 is used to direct the gas flow 265 upon workpiece 130 at an angle θ. In one embodiment, the nozzle 260 is the AIR KNIFE nozzle manufactured by Exair.

Angle θ is the angle between gas flow 265 and workpiece 130. Angle θ is possibly between 1 and 50 degrees, and is preferably 10 degrees. Angle θ is important to gas delivery subsystem 200 to counteract ablation pressure and remove debris, but angle θ is also selected so that it does not contribute to workpiece deformation. If angle θ is too large, it contributes to workpiece deformation.

Gas flow 265 is a flow of gas used to perform two important functions in the gas delivery subsystem 200. Examples of gasses used to create gas flow 265 include (but are not limited to) air, nitrogen, and argon. The first function of gas flow 265 is to create a reduced atmospheric pressure in front of the target area of workpiece 130 that exerts a force upon workpiece 130 to counteract the recoil pressure upon workpiece 130. The second function of gas flow 265 is to remove debris from the surface of workpiece 130 during drilling. Debris removal further contributes to the ability of laser micromachining to create a product that meets specification. When incident upon workpiece 130, the gas flow 265 has a range of speed of 2–132 m/s, optimally 15 m/s, and a range of flow of 0.3–4.1 cubic feet per minute (CFM), optimally 0.98 CFM, thereby creating a reduction in atmospheric pressure in the range of 2.7 to 56,000 Pascal, optimally 536 Pascal. In addition, the gas flow 265 has a humidity range of 10–1000 parts per million (ppm) and a particulate size range of 0.01–0.1 micrometer. In one example, gas flow 265 is comprised of an air flow. In another example, gas flow 265 is comprised of nitrogen, or other inert gas.

In operation, workpiece 130 is removably attached to workpiece holder 100 via vacuum source 112, as previously discussed. Gas delivery means 250 delivers gas through the nozzle 260 to the surface of workpiece. 130 at angle θ, thereby creating a reduced atmospheric pressure in front of the target area of workpiece 130. The force of sub-beams 145 upon workpiece 130 is countered by the reduced atmospheric pressure, such that the workpiece 130 remains in the focal plane 135 throughout drilling.

Gas delivery system 200 solves the problems left unresolved in the prior art and keeps the surface area of flimsy workpiece 130 in focal plane 135 of sub-beams 145 of a laser drilling system by creating a reduced atmospheric pressure in front of the pattern target area of workpiece 130 that counteracts the recoil pressure upon workpiece 130.

FIG. 3 illustrates an exemplary method 300 for reducing atmospheric pressure proximate to the target area of the workpiece using the gas delivery subsystem 200. The method generally includes the steps of: placing the workpiece on the workpiece holder; fastening the workpiece to the workpiece holder; turning on purge gas; drilling a pattern into the workpiece; turning off purge gas; and unfastening and removing the workpiece from the workpiece holder.

First, the workpiece 130 is placed on workpiece holder 100 at step 310. For instance, an automated machine may obtain the workpiece 130 to be drilled and places it upon the workpiece holder 100 in a mass-manufacturing environment. In another instance, a system operator places the workpiece 130 upon workpiece holder 100 by hand.

Next, the workpiece 130 is fastened to workpiece holder 100 at step 320, such that it is stationary during laser drilling. In one example, workpiece 130 is fastened by turning on vacuum source 112 to remove air from groove 110, sealing workpiece 130 against first and second faces 150, 155 of the workpiece holder 100. In another example, workpiece 130 is fastened to workpiece holder 100 with an adhesive.

At step 330, the gas delivery means 250 is turned on and gas flow 265 is incident upon workpiece 130. Gas flow 265 performs the functions of: (1) creating a zone of reduced atmospheric pressure in front of workpiece 130 to counteract the recoil pressure exerted upon workpiece 130 by sub-beams 145; and (2) removing drilling debris from the pattern target area of workpiece 130. Creating the zone of reduced atmospheric pressure is critical in solving the problem of keeping a flimsy workpiece in the focal plane of a parallel process laser drilling system.

A drilling pattern is then drilled at step 340 into the exposed surface of the workpiece 130. In this step, the desired pattern is drilled by maneuvering sub-beams 145 upon workpiece 130. In one example, pre-defined milling algorithms (and, if required, correction algorithms) are stored in a computer (not shown) and communicated to elements of the laser drilling system (not shown).

Upon completion of the laser drilling operation, the gas delivery means 250 is turned off at step 350, such that gas flow 265 is no longer incident upon workpiece 130.

Finally, the workpiece 130 is unfastened from the workpiece holder 100 at step 360 and then removed from the workpiece holder 100 at step 370. In one example, the vacuum source 112 is turned off, breaking the air seal between the workpiece 130 and the workpiece holder 100, thereby allowing removal of the workpiece 130. In another example, the adhesive seal between workpiece 130 and workpiece holder 100 is broken to allow removal of workpiece 130.

If necessary, a subsequent workpiece 130 can be placed upon workpiece holder 100. If so, processing returns to step 310 of the method; otherwise processing is complete.

A laser drilling system in accordance with the present invention may be used to construct a nozzle plate of an ink-jet head as further described below. Referring to FIG. 4, an ink-jet printer 1140 includes an ink-jet head 1141 capable of recording on a recording medium 1142 via a pressure generator. The ink-jet head 1141 is mounted on a carriage 1144 capable of reciprocating movement along a carriage shaft 1143.

In operation, ink droplets emitted from the ink-jet head 1141 are deposited on the recording medium 1142, such as a sheet of copy paper. The ink-jet head 1141 is structured such that it can reciprocate in a primary scanning direction X in parallel with the carriage shaft 1143; whereas the recording medium 1142 is timely conveyed by rollers 1145 in a secondary scanning direction Y.

Figure 5:
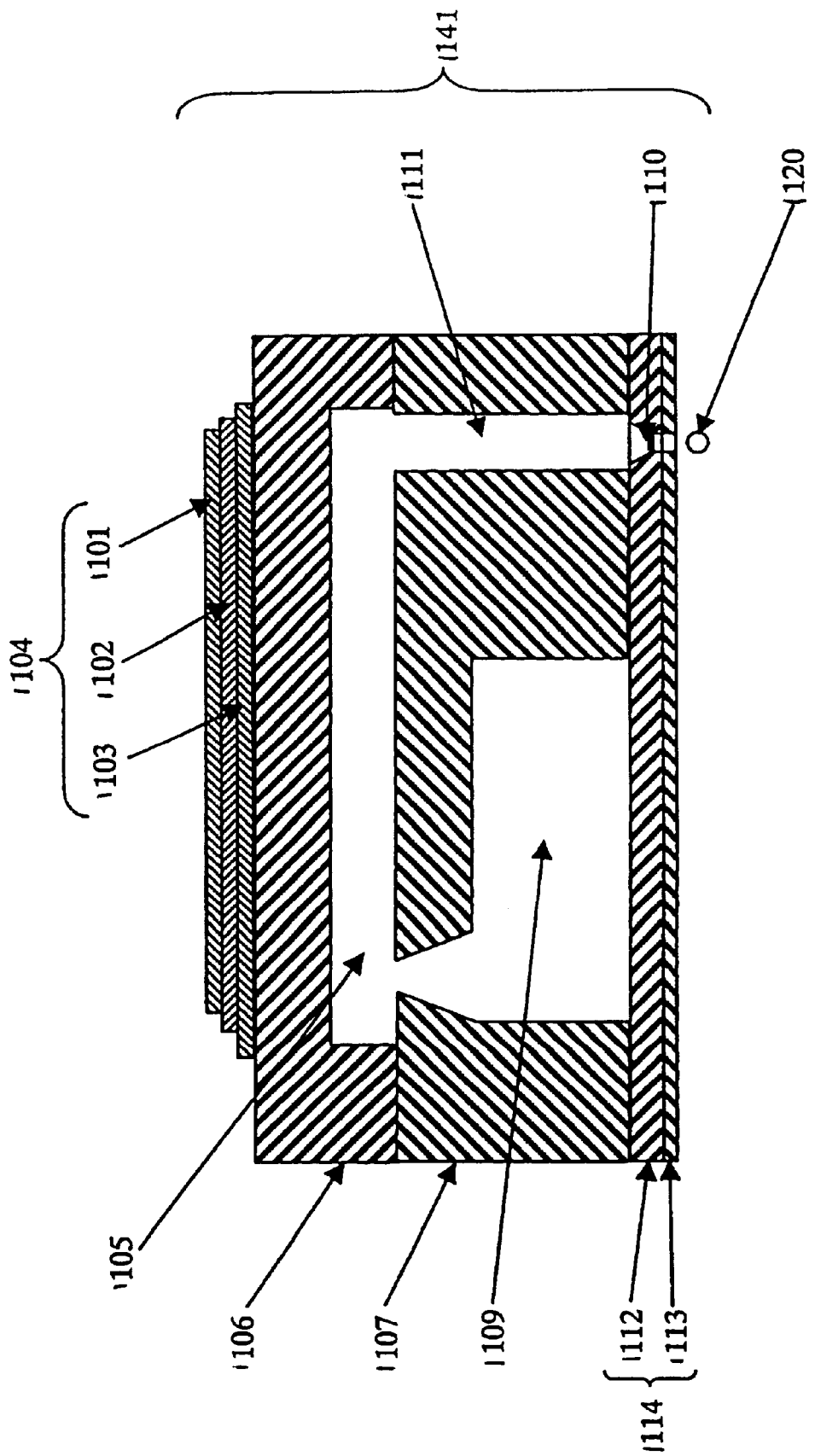
FIG. 5 is a cross-sectional schematic view of an exemplary ink-jet head.

FIG. 5 further illustrates the construction of an exemplary inkjet head 1141. The ink-jet head is primarily comprised of a pressure generator 1104 and a nozzle plate 1114. In this embodiment, the pressure generator 1104 is a piezoelectric system having an upper electrode 1101, a piezoelectric element 1102, and a lower electrode 1103. Although a piezoelectric system is presently preferred, it is envisioned that other types of systems (e.g., a thermal-based system) may also be employed by the ink-jet head 1141.

The nozzle plate 1114 is further comprised of a nozzle substrate 1112 and a water repellent layer 1113. The nozzle substrate 1112 may be constructed from a metal or resin material; whereas the water repellant layer 1113 is made of fluororesin or silicone resin material. In this exemplary embodiment, the nozzle substrate 1112 is made of stainless steel having a thickness of 50 um and the water repellent layer 1113 is made of a fluororesin having a thickness of 0.1 um.

The ink-jet head 1141 further includes an ink supplying passage 1109, a pressure chamber 1105, and an ink passage 1111 disposed between the pressure generator 1104 and the nozzle plate 1114. In operation, ink droplets 1120 are ejected from the nozzle 110. The nozzle 1110 is preferably formed without flash and foreign matter (e.g., carbon, etc.) in the nozzle plate. In addition, the accuracy of the nozzle outlet diameter is 20 um±1.5 um.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for maintaining a workpiece in a focal plane of a laser drilling system, comprising:
providing a workpiece holder that is adapted to releasably retain a workpiece on a planar surface thereof, the planar surface having a recess extending therein;
positioning the workpiece onto a planar surface of a workpiece holder, such that the workpiece extends across the recess formed in the workpiece holder and an exposed surface of the workpiece aligns with a focal plane of a laser drilling system;
projecting a laser beam from the laser drilling system onto the exposed surface of the workpiece, thereby forming an ablation on the exposed surface of the workpiece; and
directing a flow of gas onto the exposed surface of the workpiece substantially concurrent with the step of projecting a laser beam, such that the flow of gas substantially impinges on an area of the exposed surface that extends across the recess formed in the workpiece holder, thereby maintaining the exposed surface of the workpiece in the focal plane of the laser drilling system during the laser drilling operation.

2. The method of claim 1 wherein the laser beam is incident upon the area of the exposed surface of the workpiece that extends across the recess formed in the workpiece holder.

3. The method of claim 1 wherein the step of directing a flow of gas onto the exposed surface reduces atmospheric pressure in an area adjacent to the exposed surface of the workpiece, thereby counteracting pressure exerted on the exposed surface of the workpiece by the laser beam.

4. The method of claim 3 wherein the reduction in atmospheric pressure in the area adjacent to the exposed surface is in the range of 2.7 to 56,000 Pascal.

5. The method of claim 1 wherein the step of directing a flow of gas further comprises removing debris from the exposed surface of the workpiece.

6. The method of claim 1 wherein the flow of gas impinges on the exposed planar surface of the workpiece at an angle between one degree and fifty degrees as measured from the surface of the workpiece.

7. The method of claim 1 wherein the flow of gas impinges on the exposed planar surface of the workpiece at an angle of ten degrees as measured from the surface of the workpiece.

8. The method of claim 1 wherein the step of directing a flow of gas further comprises using an air pump to supply a flow of air.

9. The method of claim 1 wherein the step of positioning the workpiece further comprises using a vacuum integrated into the workpiece holder to secure the workpiece to the workpiece holder.

10. A laser drilling system, comprising:
a laser subsystem operable to project a laser beam onto an exposed surface of a substantially planar workpiece;
a workpiece holder being adapted to releasably retain the workpiece on a planar surface thereof, the planar surface having a recess extending therein;
a means for securing the workpiece to the planar surface of the workpiece holder, such that the workpiece extends across the recess formed in the workpiece holder; and
a gas delivery subsystem operable to direct a flow of gas onto the exposed planar surface of the workpiece, such that the flow of gas substantially impinges on an area of the exposed planar surface that extends across the recess formed in the workpiece holder.

11. The laser drilling system of claim 10 wherein the laser beam is incident upon the area of the exposed surface of the workpiece that extends across the recess formed in the workpiece holder.

12. The laser drilling system of claim 10 wherein the flow of gas impinges on the exposed planar surface of the workpiece at an angle between one degree and fifty degrees as measured from the surface of the workpiece.

13. The laser drilling system of claim 10 wherein the flow of gas impinges on the exposed planar surface of the workpiece at an angle of ten degrees as measured from the surface of the workpiece.

14. The laser drilling system of claim 10 wherein the flow of gas creates a reduced atmospheric pressure in an area adjacent to the exposed planar surface of the workpiece.

15. The laser drilling system of claim 14 wherein the reduction in atmospheric pressure is in the range of 2.7 to 56,000 Pascal.

16. The laser drilling system of claim 10 wherein the flow of gas having a speed in the range of 2 to 132 meters/second.

17. The laser drilling system of claim 10 wherein the flow of gas having a flow rate in the range of 0.3 to 4.1 cubic feet per minute.

18. The laser drilling system of claim 10 wherein the workpiece is comprised of a foil material.

19. The laser drilling system of claim 10 wherein the workpiece holder further includes at least one groove formed into the planar surface of the workpiece and disposed between the recess and a periphery sidewall of the workpiece holder, and a vacuum passage extending through the workpiece holder and having an opening fluidly into the at least one groove.

20. The laser drilling system of claim 10 wherein the means for securing the workpiece further comprises a vacuum operably connected to the vacuum passage of the workpiece holder.

21. The laser drilling system of claim 10 wherein the gas delivery subsystem further comprises a nozzle for directing the flow of gas flow towards the exposed planar surface of the workpiece; and ah air pump fluidly connected to the nozzle and operable to supply a flow of air thereto.

22. The method of claim 1 wherein the workpiece is further defined as a nozzle plate for an ink-jet head.

23. The laser drilling system of claim 10 wherein the workpiece is further defined as a nozzle plate for an ink-jet head.

* * * * *